United States Patent [19]
Miczek

[11] 3,930,816
[45] Jan. 6, 1976

[54] STRUCTURE FOR A GAS AND LIQUID CONTACTING CHAMBER IN A GAS EFFLUENT PROCESSING SYSTEM

[76] Inventor: Gerhard Miczek, Apt. No. 4, 1501 Cowling Ave., Louisville, Ky. 40205

[22] Filed: Apr. 23, 1973

[21] Appl. No.: 353,347

[52] U.S. Cl. .................. 55/238; 55/257; 55/457; 261/79 A; 261/110
[51] Int. Cl.² ........................................ B01D 47/00
[58] Field of Search ............ 261/79 A, 110; 55/257, 55/235, 237, 238, 457, 392, 394, 396, 397, 399, 450, 459

[56] References Cited
UNITED STATES PATENTS

| 630,023 | 8/1899 | Baker | 55/396 X |
|---|---|---|---|
| 2,233,019 | 2/1941 | Linderman, Jr. | 261/79 A |
| 2,343,682 | 3/1944 | McCurdy | 55/457 |
| 2,351,864 | 6/1944 | Linderman, Jr. | 261/79 A |
| 2,886,297 | 5/1959 | Crandall | 261/79 A X |
| 3,131,041 | 4/1964 | Gupner | 55/235 |
| 3,722,185 | 3/1973 | Miczek | 261/79 A X |

FOREIGN PATENTS OR APPLICATIONS

| 192,385 | 10/1957 | Austria | 55/396 |
|---|---|---|---|

Primary Examiner—Frank W. Lutter
Assistant Examiner—William Cuchlinski, Jr.
Attorney, Agent, or Firm—George C. Atwell

[57] ABSTRACT

An elongated cylindrical casing defines a contacting chamber of the type used in a gas effluent processing system. The casing is disposed with its longitudinal axis in a vertical orientation and has conduit means disposed to direct gas and liquid flows into the upper end of the chamber for generally downward concurrent intermixing progression whereby particulate matter is transferred from the gas flow to the liquid prior to discharge of the separate flows from the lower end of the contacting chamber. The lower discharge end of the casing has an improved structural configuration that overcomes certain problems inherent in prior art apparatus designed for accomplishing the same purpose. Flow control means is also disclosed for use within the chamber to further enhance the operational efficiency of the contacting chamber.

3 Claims, 3 Drawing Figures

IMPROVED STRUCTURE FOR A GAS AND LIQUID CONTACTING CHAMBER IN A GAS EFFLUENT PROCESSING SYSTEM

BACKGROUND OF THE INVENTION

This invention relates generally to apparatus and method for intimately contacting an effluent gas flow with a treating liquid such as water whereby fine particulate solids carried in the gas flow are transferred to the liquid flow prior to further treatment of the gas or its exhaustion into the atmosphere. More particularly, the invention pertains both to the structural design and the use of a gas and liquid contacting chamber that may comprise a part of a gas effluent processing system.

It is a known practice to utilize a contacting chamber, often referred to as a dust collector, to subject a particle-laden gas flow to a liquid flow by centrifugally whirling the gas flow to insure thorough intermixing with the liquid flow and thereby cleanse the gas of the particulate solids carried therein. Once the transfer action has been completed within the chamber whereby the particulate matter is picked up by liquid droplets, the cleaned gas and the liquid are discharged as separate flows from the chamber. Where the aforementioned method is carried out through the use of a cylindrical casing defining the contacting chamber and the liquid and gas are introduced to the chamber to move generally concurrently therethrough from the upper end toward the lower, it is a known practice to have the lower end wall of the cylindrical casing converge to a funnel-like discharge outlet for the liquid, and to have a substantially large gas outlet in the form of a cylindrical duct of smaller diameter than the chamber disposed concentrically within the chamber's lower end and projecting outwardly therefrom to exhaust the gas flow from the chamber. The arrangement heretofore described is to enable the liquid, which progresses downwardly through the chamber along the inner sidewall surface thereof because of the centrifugal forces of the whirling gas flow, to be channeled by the casing's converging lower end to a relatively small liquid outlet conduit. Two examples of a lower end arrangement for such a chamber are shown in a Czechoslovakian Pat. No. 96056. FIG. 1 thereof discloses a contacting chamber having an oblique bottom wall for directing liquid flow to a discharge conduit and a large tubular duct for exhausting gas from the chamber. The patent also has a FIG. 4 showing a pair of gas ducts each projecting through inwardly converging surfaces, with the latter surfaces meant to guide liquid flow to a common axially aligned outlet conduit.

Several problems have been recognized in the construction and use of collecting chambers or separators of the aforementioned types. In the lower end of such a chamber, the circumferential force of the centrifugal gas whirl acts upon the liquid flow and tends to prevent it from following the desired course established by the converging or oblique lower end of the chamber. This inhibiting of the liquid flow effectively retards it from direct rapid entry to the outlet conduit such that particulate solids are lost from the water flow. These solids then tend to build up on the converging surface of the chamber's lower end. Moreover, the described prior art arrangements for a collecting chamber lower end often constitute a substantially large and bulky portion representing high material and manufacturing costs not commensurate with its relatively poor functional efficiency.

SUMMARY OF THE INVENTION

In one of its aspects, the present invention provides a tubular casing establishing a contacting chamber that may be one of several distinct components in a gas effluent processing system. The tubular casing is disposed with its longitudinal axis extending generally in a vertical direction and has means preferably at its upper end for directing separate gas and liquid flows into the casing to the chamber defined thereby. Tangentially arranged conduits are provided whereby an initial concurrent intermixing flow of gas and liquid is established that spirals progressively downwardly through the chamber. The casing also includes structural means at its lower end for discharging separate gas and liquid flows from the chamber. The discharge means or arrangement includes a gas exhaust conduit having a diameter less than the diameter of the chamber and having its upper end extending centrally upwardly into the chamber and preferably concentrically therewith whereby it establishes, in cooperation with the chamber's sidewall, an annular surrounding space or liquid flow passage. The lower termination of the annular liquid passage is a downwardly spiraling surface that may be described as a screw-like flat member descending to a liquid outlet conduit directed laterally outwardly from the chamber's sidewall. The liquid outlet conduit is arranged to receive liquid flow directed thereto by the downwardly spiraling surface and to drain the liquid out of the chamber.

In another aspect, the present invention in its preferred form may include means or structure for effecting or controlling both the gas flow and the liquid flow whereby the intermixing and total contact of the liquid flow with the gas flow is significantly increased. This structure may include a plurality of vertically spaced-apart rigid ring-like segments or members disposed to define annular channels therebetween, and may further include a flow control element comprising a central flow interrupting portion acting to force the whirling gas flow outwardly through an annular passage having a plurality of spaced apart flow-directing blade-like elements disposed in a uniformly pitched circumferential arrangement therein.

The aforementioned apparatus enables significant improvement in the rate of particle transfer from the gas flow to the liquid within the chamber such that a substantially cleaner gas is discharged from the contacting chamber. The method of accomplishing this improvement will be better appreciated from the ensuing detailed description of the apparatus and the explanation of its use and operation.

DETAILED DESCRIPTION OF THE PREFERRED EMBODIMENT

Figure 1:
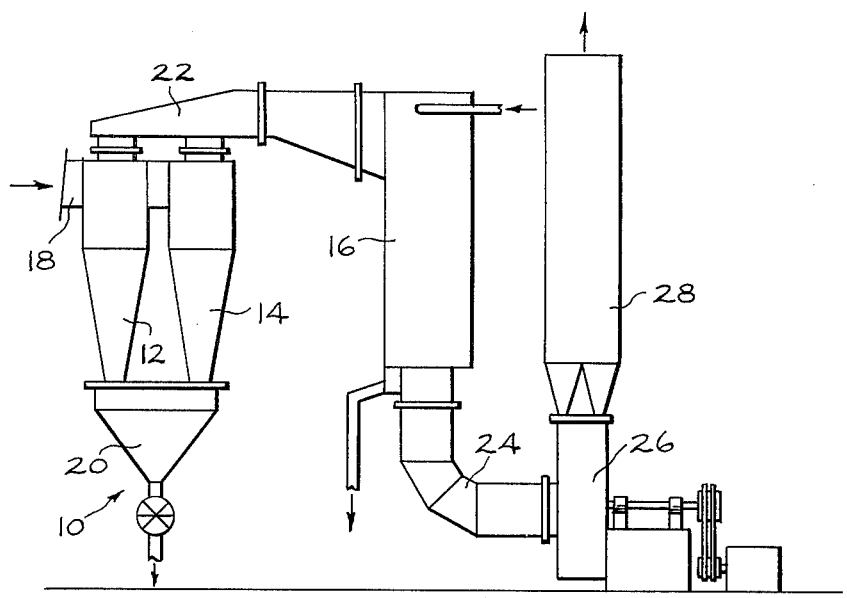
FIG. 1 is an elevational view illustrating a gas effluent processing system comprising several separate gas treating components.

In FIG. 1 there is shown a system 10 including components 12, 14 and 16 for treating industrial gases whereby particulate matter is cleansed from the gas in order to render the gas substantially free of such pollutants before the gas is exhausted into the atmosphere. Components 12 and 14 are a pair of co-extending cyclone separators adapted to receive effluent gas flow through an inlet conduit 18. Within the cyclone separators the gas flow is centrifugally whirled such that substantially heavy particulate matter is dislodged from the flow to funnel downwardly through a collecting chamber 20. After this initial treatment the contaminated gas flow moves through a connecting duct 22 toward a component 16 wherein the gas flow is thoroughly intermixed with a liquid flow to achieve further removal of particulate solids from the gas flow through a transfer of the particles to the liquid. In accordance with the present invention the gas flow, after treatment in the component 16, is conducted through a duct 24 to a plenum 26 having blower means therein for drawing the gas flow through the aforedescribed components and finally exhausting it outwardly through a stack 28.

Figure 2:
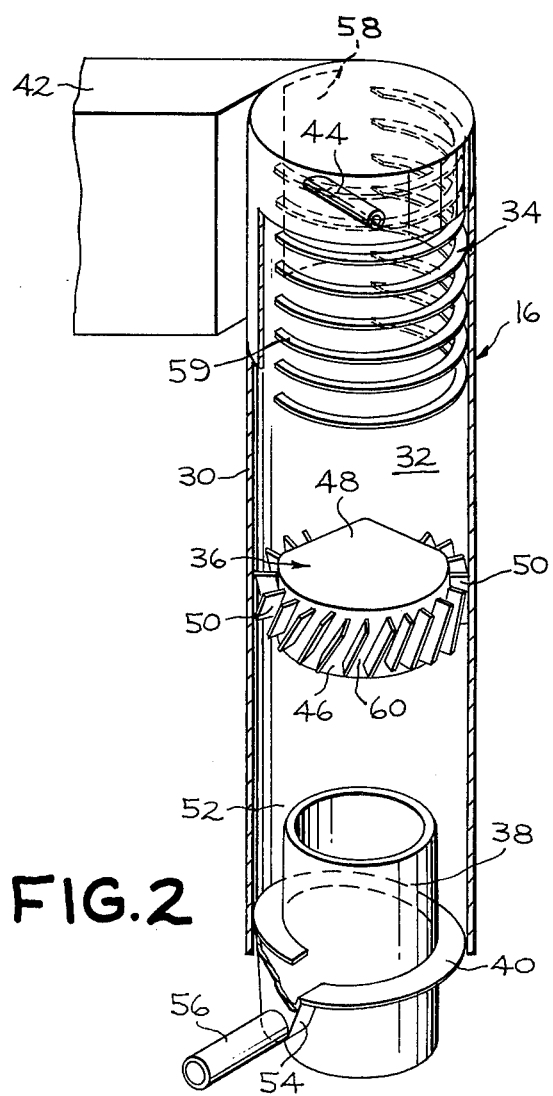
FIG. 2 is a perspective view of a contacting chamber, which may be utilized as a component in the system of FIG. 1, having a portion thereof cut away to reveal the internal elements thereof.

The component 16 of the system in FIG. 1 may be a contacting apparatus as shown in enlarged scale in FIG. 2. The contacting apparatus in FIG. 2 comprises a tubular casing or cylindrical chamber 30 defining a vertically elongated internal contacting chamber 32 having enclosed therein an upper end flow control arrangement 34, an intermediate flow control means 36, and lower end flow separating means or structure including a gas exhaust conduit 38 and a downwardly spiraling liquid flow quiding surface 40.

The upper end of the casing 30 has means therewith for directing separate gas and liquid flows into the chamber 32 including a tangentially arranged gas inlet conduit 42 and a tangentially arranged water inlet pipe 44 for providing a relatively low pressure water flow to the chamber 32.

The flow control means or assembly 36 mounted intermediate the chamber 32 comprises a generally tubular body or interrupter portion 46 having an integral dome-shaped cap 48. The diameter of the interrupter portion 46 is such that an annular space is defined between the side wall thereof and the inside surface of the tubular casing 30. Interspersed in this annular space is a plurality of spaced-apart identically pitched or canted blade-like elements 50. The interrupter portion 36 is stationarily mounted in its intermediate position within the chamber 32 preferably by means of a certain few of the blade-like elements 50 being weldably attached at their respective outer edges to the inside surface of the casing 30.

At the lower end of the contacting chamber 32 the gas exhaust conduit or tube 38 projects upwardly into the chamber 32 a sufficient distance to establish an annular surrounding space or water passage 52 defined by the outer surface of the tube 38 and the inside surface of the casing 30. The annular space 52 is terminated downwardly by a screw-like flat or floor portion presenting the aforementioned downwardly spiraling surface 40 descending gradually to a laterally situated funneling passage 54 having a liquid outlet conduit 56 in flow communication therewith.

In the use and operation of the contacting chamber 32 the gas stream entering through the tangentially oriented conduit 42 initially follows a horizontal circular pathway in the upper end of the chamber 32. A liquid bath, preferably a relatively low pressure water stream, is provided from the tangentially oriented water inlet pipe 44 whereby moving water droplets extend across the gas inlet opening or gate 58. The way in which the flow effecting means 34, having channels and ledges formed by a vertically spaced-apart plurality of ring-like segments 59, effects the gas and liquid flows is quite similar to the effect obtained by the presence of such ring-like segments in a countercurrent type of contacting chamber disclosed in my U.S. Pat. No. 3,722,185 issued Mar. 27, 1973. The water and gas flows are temporarily impeded in the upper end of the chamber by the flow effecting means 34 to insure thorough intermixing of the gas flow with the water flow in the upper end of the chamber 32. At the point where contaminated gases are moving into the chamber 32 from the conduit 42, the gate 58 is somewhat restricted relative to the conduit 42 whereby the incoming gas flow is accelerated so that it impinges against the inside chamber sidewall at a relatively increased velocity. The water flow entering through the tangentially oriented pipe 44 is of sufficient velocity that it begins an initial circumferential sweep about the upper end of the chamber 32 and is held in the upper end chamber area by the presence of the segments 59 until the flow attains such volume that it is forced to cascade downwardly in a spiraling path against the sidewall of the chamber 32 despite the presence of the segments. The effect of the water flow progressing downwardly is to form a spiraling water flow sheet against the internal surface of the chamber 32.

In the area of the contacting chamber immediately below the flow effecting means 34 the centrifugally whirling gas flow tends to occupy the central portion of the chamber and causes the cascading water flow to move against the chamber wall, thereby influencing it to form a downwardly spiraling tubular water sheet. The presence of the flow control means 36 at a point directly above the gas exhaust conduit 38 serves to decelerate or, if necessary, to accelerate the circumferential components of the gas flow without significantly effecting the flow of the water sheet running down the inside surface of the casing 30. The orientation or pitch of the elements 50 may be varied to obtain the desired deceleration or acceleration effect on the gas flow. Predetermination of the slant of the elements 50 will in turn establish the direction of the channels 60 such that the velocity of the gas flow immediately below the flow control means 36 is properly established in accordance with the other characteristics of the chamber 32 whereby significantly high operational efficiency of the apparatus is obtained. For example, the orientation of the elements 50 may be generally against the direction of gas flow to have the effect of decelerating the whirling gas flow moving down across the control means 36 whereby a relatively small consumption of energy from the flow is required to obtain entry of the gas into the outlet tube 38.

The dome-shaped cap 48 of the interrupter 46 serves to divert the gas flow from the central or axial space of the contacting chamber toward the inside surface of the casing 30 whereby liquid droplets being carried in the gas flow are transferred to the water sheet on the casing wall. It is preferred that most of the elements 50 projecting radially from the interrupter 46 do not touch the inside wall of the casing 30 so that the water sheet flowing downwardly against the casing wall surface is not significantly interrupted or disturbed by the elements 50.

In the area beneath the flow control means 36 the spiraling action of the gas flow is continued and again has the effect of causing the water flow to move as a circumferentially descending sheet against the inside surface of the casing 30. The disclosed configuration of the lower end of the chamber 32, as shown in FIG. 2, takes advantage of the centrifugal force of the gas flow to achieve rapid and thorough drainage of the chamber 32 without the undesirable build up of particulate solids within the lower end of the chamber 32 that would materially detract from the efficiency of the chamber's operation. The whirling gas flow tends to push the descending water sheet outwardly against the inside surface of the casing 30 whereby the water is channeled downwardly into the annular space 52 while the gas flow escapes from the chamber 32 through the substantially larger centrally disposed tube 38. Because the water sheet progresses through the space 52 in a descending spiral pathway, it tends to be guided by the gradually descending surface 40 to enter the funnel passage 54 and exit through the drain conduit 56. It has been determined that by having the lower terminus of the annular space 52 slanted in the natural direction of flow as shown in FIG. 2, the water is driven rapidly by the gas whirl, which also moves circumferentially in the annular space 52, directly to the water outlet such that particulate matter carried in the flow is not dislodged therefrom to cause undesirable flow-impeding buildup.

Figure 3:
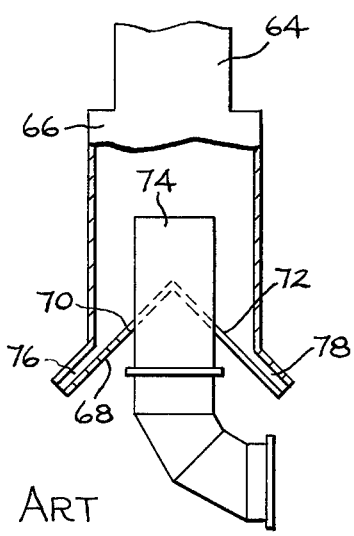
FIG. 3 is a fragmentary elevational view of the lower end of a contacting chamber apparatus illustrating a known prior art configuration for achieving separate discharge of liquid and gas flows after intermixing contact for removal of particulate solids from the gas flow has been completed.

To fully appreciate the advantages of the aforementioned lower end chamber construction, it is believed desirable to briefly consider the effect obtained by a known configuration in the prior art. FIG. 3 shows such a configuration for the lower end of a contacting chamber including a tubular casing 64 having a radially widened portion 66. The bottom 68 of the portion 66 is constructed with downwardly-outwardly diverging or oblique flat sections providing water drainage surfaces 70 and 72. A central tubular gas exhaust conduit 74 projects upwardly through the bottom 68. It has been determined, in this type of construction, that the whirling gas flow moving downwardly from the casing 64 and into the area defined by the widened portion 66 tends to drive the water flow in a concurrent direction against the inside surface of the portion 66, and as the water flow reaches the lower end of the widened portion 66, abruptly against the slanting surfaces 70 and 72. The circular progression of the water flow and its tendency to move laterally across the surfaces 70 and 72, and transverse to drain conduits 76 and 78 provided therefor, results in undesirable particulate solid buildup against the surfaces 70 and 72 that can, in turn, result in early blocking of the drain conduits 76 and 78.

The structure of the present invention, as shown in FIG. 2, wherein the configuration of structural components relating to drainage of the chamber 32 is made compatible with the circumferential direction of flow within the chamber, eliminates the problems encountered in prior art apparatus, such as shown in FIG. 3, wherein the inclination of surfaces 70 and 72 acts in opposition to the motive power of the gas whirl to cause the buildup of an undesirable solid crust that will effectively reduce usefulness of the apparatus. In the present invention, the particulate matter accompanies the water flow out of the chamber rather than departing from the flow as heretofore described, and this effect is obtained by taking advantage of the force and direction of the gas flow to sweep the water flow from the chamber. In comparison with devices of the prior art, as heretofore described with reference to FIG. 3 and as shown for example in the aforementioned Czechslovakian Pat. No. 96056, it has been conclusively determined that the structure of the present invention enables a smooth and undisturbed draining of liquid out of the space 52.

The preceding description and the illustration in FIG. 2 of the drawing pertain only to the presently preferred form of the invention. It is intended that the appended claims define the subject matter of the invention and it is specifically not intended that the invention be limited to the particular details of construction in the example given; therefore, although the invention has been described with a certain degree of particularity, it is understood that numerous changes or modifications in the details of the construction and the combination or arrangement of parts may be resorted to without departing from the spirit or scope of the invention.

I claim:

1. In a gas effluent processing system, gas and liquid contacting apparatus adapted to separate particulate matter from a contaminated gas flow comprising an elongated cylindrical casing defining a contacting chamber, said casing disposed with its longitudinal axis extending generally vertically and having inlet conduit means disposed to direct contaminated gas and scrubbing liquid flows into contact within said chamber whereby said flows progress downwardly in a spiraling flow path therethrough and particulate matter is transferred from said gas flow to said liquid flow, means disposed at the lower end of said casing for exhausting gas flow from said chamber comprising an exhaust conduit having an upper end portion extending centrally upwardly into said chamber whereby surrounding space for liquid flow is defined between said upper end of said conduit and the sidewall of said casing, the lower end of said surrounding space being defined by a floor portion having a gradually downwardly spiraling surface which descends in a direction concurrent with the path of said whirling gas flow, leading to a liquid outlet conduit, said liquid outlet conduit being located below said floor portion and being directed generally outwardly for the purpose of receiving liquid flow guided thereto by said downwardly spiraling surface and draining said liquid flow with particulate matter therein away from said chamber, means located in the upper end of said chamber on a level of said inlet conduit means adapted to effect intermixing contact between the entering contaminated gas flow and the liquid flow comprising a plurality of ring-like segments disposed generally concentric to the chamber's longitudinal axis, each of said ring-like elements being generally planar in cross-section and having an outer pheripheral edge fastened in firm abutment against the inside surface of said casing and being extended radially-inwardly toward said chamber's longitudinal axis such that each of said segments forms a ledge for intersecting liquid flow moving downward to the chamber, the ring-like elements being vertically spaced apart to form a plurality of annular flow channels oriented in a descending arrangement, and said channels being disposed relative to the inlet conduit means so that the contaminated gas flow moves initially through said chamber circumferentially within said channels.

2. In a gas effluent processing system, gas and liquid contacting apparatus adapted to separate particulate matter from a contaminated gas flow comprising an elongated cylindrical casing defining a contacting chamber, said casing disposed with its longitudinal axis extending generally vertically and having inlet conduit means disposed to direct contaminated gas and scrubbing liquid flows into contact within said chamber whereby said flows progress downwardly in a spiraling flow path therethrough and particulate matter is transferred from said gas flow to said liquid flow, means disposed at the lower end of said casing for exhausting cleansed gas flow from said chamber comprising an exhaust conduit having an upper end portion extending centrally upwardly into said chamber whereby surrounding space for liquid flow is defined between said upper end of said conduit and the sidewall of said casing, the lower end of said surrounding space defined by a floor portion having a gradually downwardly spiraling surface descending in a direction concurrent with the path of said whirling gas flow and leading to a liquid outlet conduit, said liquid conduit being located below said floor portion and being directed generally outwardly for the purpose of receiving liquid flow guided thereto by said downwardly spiraling surface and draining said liquid flow with particulate matter therein away from said chamber, gas flow control means within said chamber adapted to influence said gas flow to progress downwardly through said chamber in a winding pathway, said gas flow control means comprising a stationary flow diverting device disposed within said chamber at a point intermediate its length, said diverting device having a flow interrupter portion centrally located above the entrance into said exhaust conduit, said interrupter portion having blade-like elements therewith projecting radially outwardly toward the sidewall of said casing, said blade-like elements are disposed in a spaced-apart relation whereby flow channels are formed between adjacent elements, and said elements are inwardly attached to said interrupter portion, and at least a majority of said elements terminate short of the side wall of said casing whereby an unobstructed passage for liquid flow is defined at the outer end of most of said elements.

3. The apparatus of claim 2 further including means for increasing the velocity of the contaminated gas flow at a point preceding the initial contact of the contaminated gas flow with the liquid flow within said chamber.

* * * * *